(12) United States Patent
Ryan

(10) Patent No.: US 7,131,531 B1
(45) Date of Patent: Nov. 7, 2006

(54) ROLLER SHOES IN MODULAR-BELT CONVEYORS

(75) Inventor: Robert S. Ryan, Lansdale, PA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/908,605

(22) Filed: May 18, 2005

(51) Int. Cl.
B65G 35/10 (2006.01)

(52) U.S. Cl. ............ 198/842; 198/813; 193/35 R

(58) Field of Classification Search ........ 198/842, 198/837, 813; 193/35 R, 35 A
See application file for complete search history.

(56) References Cited

U.S. PATENT DOCUMENTS

| | | | | |
|---|---|---|---|---|
| 3,590,984 A | * | 7/1971 | Nolte ............ | 198/806 |
| 3,669,238 A | * | 6/1972 | Folkes et al. ........ | 198/805 |
| 4,166,528 A | * | 9/1979 | Renner ............ | 198/825 |
| 4,347,794 A | * | 9/1982 | Nordstrom .......... | 108/57.15 |
| 4,706,793 A | * | 11/1987 | Masciarelli ......... | 193/35 A |
| 4,720,008 A | * | 1/1988 | Ufland ............ | 198/841 |
| 4,887,937 A | * | 12/1989 | Thunnissen ......... | 414/527 |
| 4,898,272 A | | 2/1990 | Swinderman et al. .... | 198/841 |
| 5,310,047 A | | 5/1994 | Ledingham ......... | 198/841 |
| 5,390,775 A | * | 2/1995 | Herrick et al. ....... | 193/35 R |
| 5,915,515 A | * | 6/1999 | Blair ............. | 193/35 SS |
| 5,927,478 A | | 7/1999 | Archer ............ | 198/823 |
| 5,947,676 A | * | 9/1999 | Richard ........... | 414/535 |
| 6,112,875 A | | 9/2000 | Gibson ............ | 193/35 R |
| 6,401,900 B1 | * | 6/2002 | Masciarelli, Jr. ...... | 193/35 MD |
| 6,516,934 B1 | * | 2/2003 | Masciarelli, Jr. ...... | 193/35 SS |
| 6,769,528 B1 | * | 8/2004 | Plesh, Sr. .......... | 193/35 R |
| 6,799,676 B1 | | 10/2004 | Shipmon ........... | 198/780 |

\* cited by examiner

*Primary Examiner*—Joe Dillon, Jr.
(74) *Attorney, Agent, or Firm*—James T. Cronvich

(57) ABSTRACT

Roller return and holddown shoes for a modular-belt conveyor. The shoes have a body that extends in height from a base to a convex outer face. Cavities in the body open onto the base and the outer face. Rollers rotatably received in the cavities have salient portions protruding past the outer face of the shoe to bear in rolling contact against the outer surface of a belt draped over the shoe. Optional edge guides upstanding from the outer face of the shoe may be used to restrain the side edge of a belt supported on the shoe and prevent the belt from wandering laterally.

19 Claims, 3 Drawing Sheets

ROLLER SHOES IN MODULAR-BELT CONVEYORS

BACKGROUND

The invention relates generally to power-driven conveyors and, more particularly, to modular-belt conveyors using shoes with rollers as holddowns and in returns.

Modular plastic conveyor belts are widely used in many conveying applications. These belts are constructed of belt modules arranged side to side in rows that are connected together end to end at hinge joints by hinge rods into endless belt loops. Because these belts are most commonly made of a slick, plastic material, they exhibit relatively low friction compared with flat rubber belts. In a typical layout, the belt loop is trained around drive and idler sprocket sets at each end of a conveying path. Articles are conveyed atop the belt supported along an upper carryway. The belt returns along a lower returnway. To minimize the maximum sag of the belt in the returnway, return shoes or rollers are often used. Return rollers typically extend across the width of the belt at selected positions along the returnway. While return rollers work well with belts having a flat outer surface completely or largely devoid of protruding elements, they can damage or interfere with flights, sideguards, and other upstanding structures on many modular belts. For these belts, shoes, which extend over only a portion of the width of the belt, are used. A typical shoe presents a curved support or bearing surface to a flat longitudinal lane of the outer surface of the belt. Most often, these lanes, devoid of upstanding elements, lie along the side edges of the belt, but lanes may exist along interior portions of the belt. (Shoes are also used along the carryway as holddowns in elevating conveyors at the transition of the belt from horizontal to incline.) In most cases, the sliding friction between the shoes and the outer surface of the plastic belt as it rides over the shoe is tolerable. But, in some applications, the friction between belt and shoes may require a stronger belt or a more powerful conveyor drive motor.

Thus, there is a need for a limited-width, low-friction return or holddown support for a modular plastic conveyor belt.

SUMMARY

These needs and others are satisfied in a belt conveyor by a shoe embodying features of the invention. In one aspect of the invention, the shoe comprises a base and an opposite outer face that extends from a first end to a second end of the shoe in a direction of conveyor belt travel. The shoe extends laterally from a first side to a second side. At least one roller, rotatably mounted at the outer face of the shoe, rotates by contact with a conveyor belt traveling along the outer face of the shoe in the direction of conveyor belt travel.

In another aspect of the invention, a shoe for bearing against a conveyor belt comprises a body that extends in height from a base to an opposite outer face, in length from a first end to a second end, and in width from a first side to a second side. One or more cavities formed in the shoe open onto its outer face. A roller is rotatably disposed in each of the cavities. A salient portion of the roller protrudes beyond the outer face of the body to rotate by contact with a conveyor belt traveling along the outer face of the body from the first end to the second end.

In yet another aspect of the invention, a conveyor comprises a conveyor belt in the form of an endless belt loop having an outer surface and an inner surface. The belt extends in width from a first side edge to a second side edge. A conveyor frame supports the conveyor belt for travel along a conveying path. A shoe is affixed along the conveying path. The shoe has an outer face and at least one roller protruding beyond the outer face into rolling contact with the outer surface of the endless belt loop.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
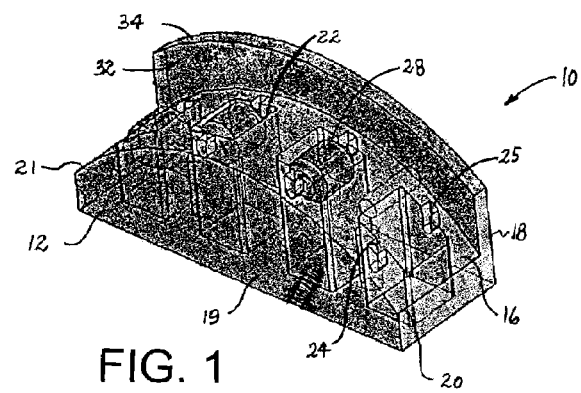
FIG. 1 is an isometric view of a return shoe embodying features of the invention including cylindrical rollers and a belt edge guide.
Figure 2A:
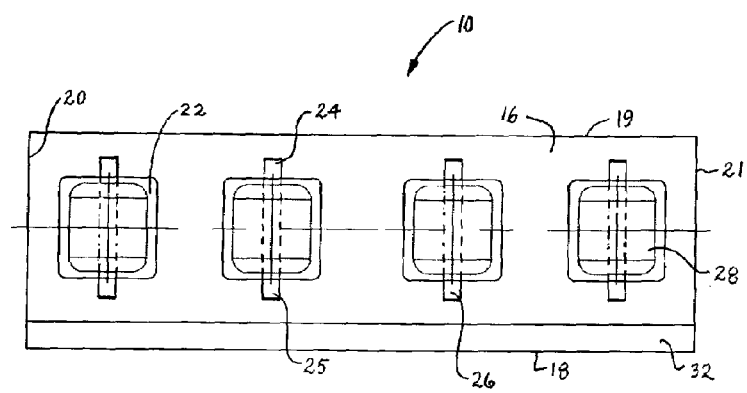
FIGS. 2A–2C are top plan, side elevation, and end elevation views of the return shoe of FIG. 1.
Figure 2B:
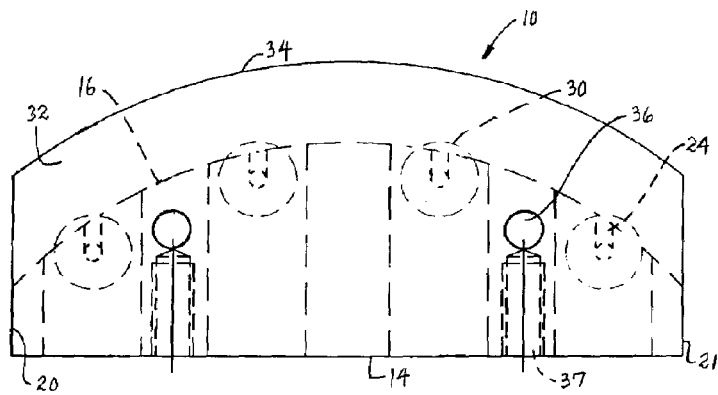
Figure 2C:
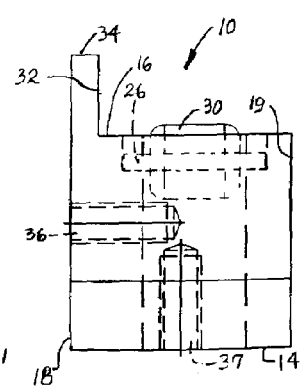

A shoe embodying features of the invention is shown in FIGS. 1 and 2A–2C. The shoe 10 includes a body 12 that extends in height from a base 14 to an outer face 16, in width from a first side 18 to a second side 19, and in length from a first end 20 to a second end 21 in the direction of belt travel. The outer face is convex, with the height of the body greatest midway between the first and second ends, to provide maximum support to a belt draped over the shoes. Cavities 22 formed in the body open onto the outer face and, preferably, onto the base to provide an outlet for debris to drop or fluids to drain through. Laterally opposed slots 24, 25 are formed in the body on opposite sides of the cavities. The slots are sized to receive the ends of an axle 26 that extends through a central bore in a generally cylindrical roller 28. Because the slots are open at the top, a roller and axle can be dropped into position in a cavity with a salient portion 30 of the roller protruding past the outer face 16 of the shoe. The roller and axle are held in place by gravity and are easy to remove for replacement. The roller, which is free to rotate on the axle supported in the slots, engages the surface of a conveyor belt supported by the shoe. The rolling contact between the belt and the shoe greatly reduces friction. Equivalently, the roller and axle could be a unit in which the roller rotates with axle stubs protruding from opposite sides of the roller and rotatably supported in the slots. Furthermore, for use as a holddown shoe, in which the shoe is generally mounted upside down, the slots would not open onto the outer face or would be plugged or covered to prevent the axle and roller from falling out.

The shoe is also shown with a belt edge guide 32 in the form of a wall upstanding from the outer face 16 of the shoe along its first side 18. The wall, which extends to an outer edge 34, prevents the side edge of a belt from wandering laterally and, in conjunction with a similar shoe on the opposite edge of the belt, confines the belt within a channel.

In a preferred version, the arcuate outer face 16 of the shoe forms a portion of an arc of a circular cylinder having a first radius, and the outer edge of the wall forms a portion of an arc of a coaxial circular cylinder having a second radius greater than the first radius.

The shoe may be mounted to a conveyor frame in any conventional way. In this example, threaded mounting holes 36, 37 opening onto the base 14 and the first side of the shoe admit screws or bolts to attach to the shoe to conveyor frame structure.

Figure 3:
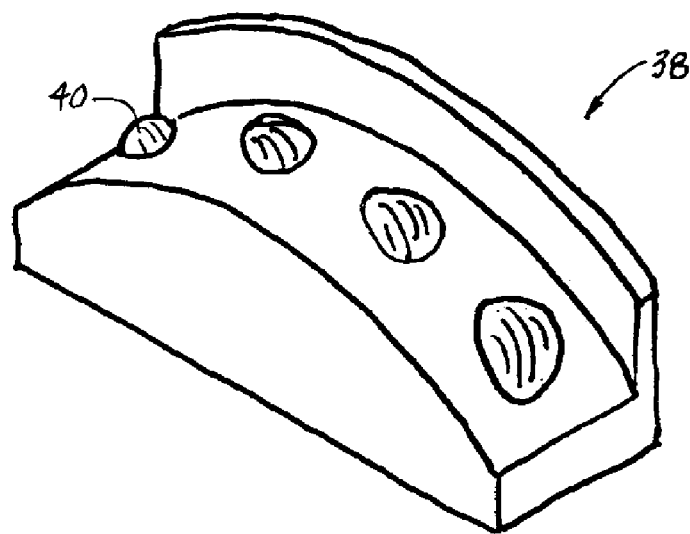
FIG. 3 is an isometric view of another version of a shoe as in FIG. 1 having spherical roller balls instead of cylindrical rollers.

Another version of roller shoe is shown in FIG. 3. In this version, the shoe 38 uses spherical roller balls 40, instead of rollers on axles. The roller balls, which may be metal or plastic, are retained in bearings to allow the balls to rotate freely when contacted by a moving belt.

Figure 4:
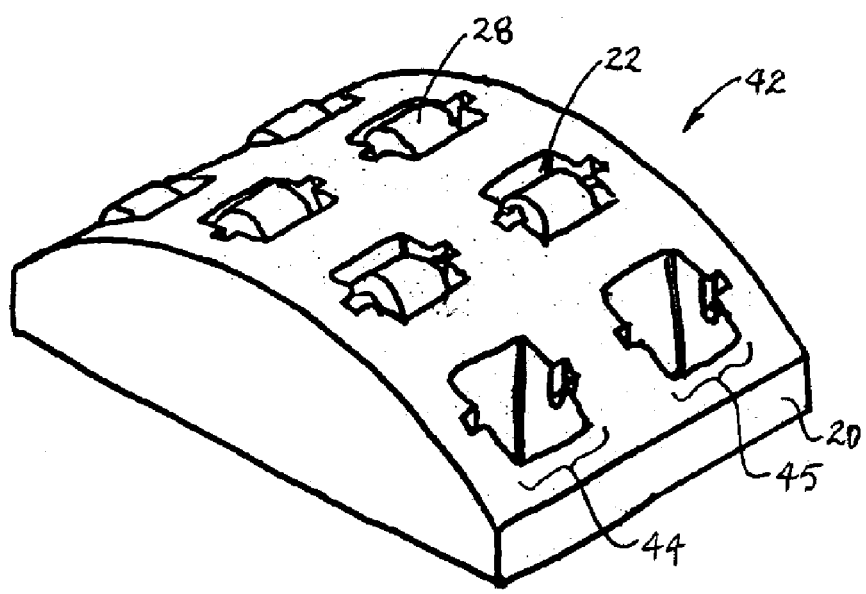
FIG. 4 is an isometric view of another version of a shoe embodying features of the invention including parallel columns of rollers and no belt edge guide.

Yet another version of shoe is shown in FIG. 4, in which the shoe 42 has two lanes 44, 45 of cavities 22 and rollers 28. (In the figure, rollers are omitted in the cavities at the first end for clarity.) This wider shoe is shown without a belt edge guide and is, consequently, suitable for bearing against an interior portion of a belt.

Figure 5:
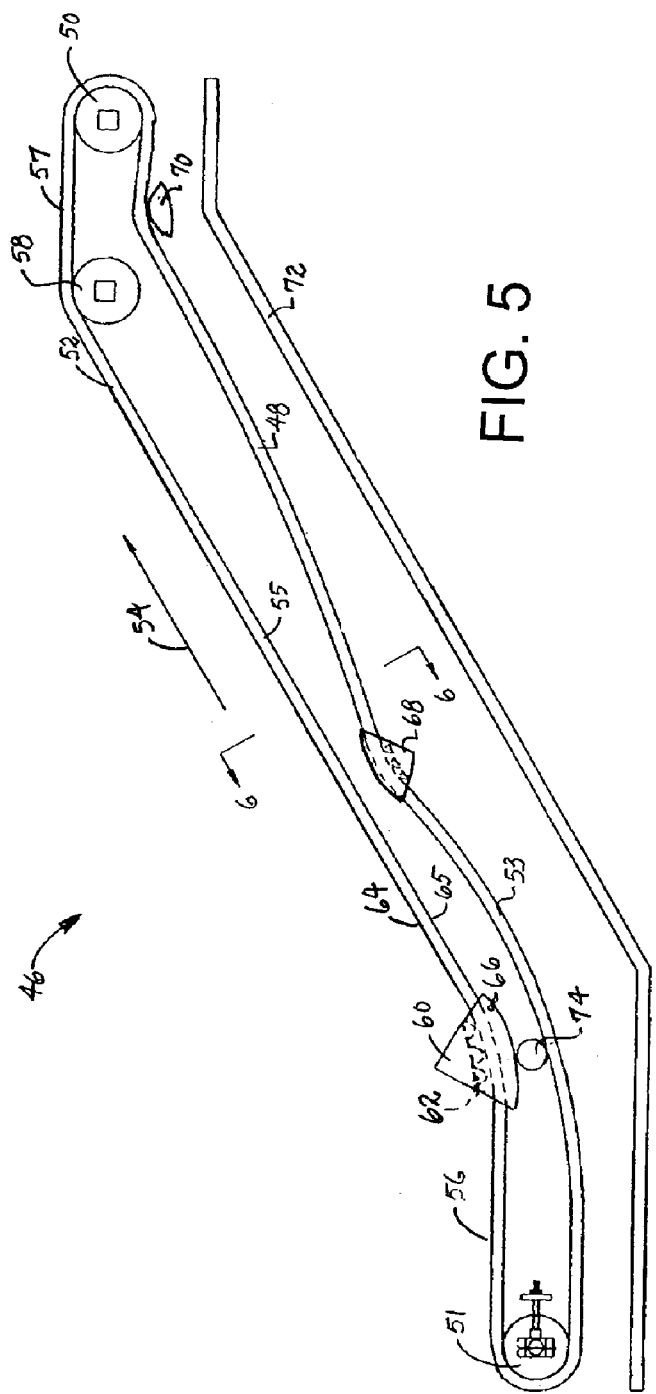
FIG. 5 is a diagram of an elevating conveyor embodying features of the invention incorporating return and holddown shoes as in FIG. 1.
Figure 6:
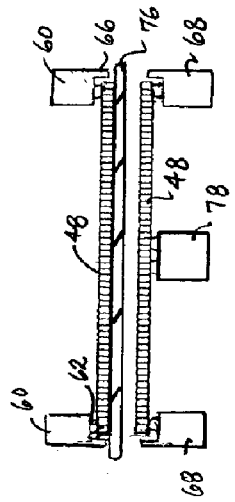
FIG. 6 is a cross section of the conveyor of FIG. 5 taken along lines 6—6.

An elevating conveyor using shoes as in FIGS. 1–4 is shown diagrammatically in FIGS. 5 and 6. The conveyor 46 has a modular conveyor belt loop 48 with an outer surface 64 and an inner surface 65 trained around drive 50 and idler 51 sprockets that define ends of an upper carryway portion 52 and a lower returnway portion 53 of a belt path. The rotating drive sprocket engaging the inner surface of the belt drives the belt in a direction of belt travel 54 up an incline 55 from a lower horizontal segment of the carryway to an upper horizontal segment 57. Intermediate sprockets 58 are used to transition the belt from the incline to the upper horizontal portion. Roller shoes 60, such as those in FIGS. 1–4, hold the conveyor belt down as it transitions from the lower horizontal portion of the carryway to the incline. The shoes' rollers 62 bear against the outer surface 64 of the belt in low-friction rolling contact. The belt is restrained against lateral wandering by the edge guide 66 on the roller shoe. Return roller shoes 68 on the returnway likewise bear against and support the outer surface of the belt and guide its edge. Shown in FIG. 5 positioned about midway along the incline, the return roller shoes, along with conventional flat shoes 40 near the drive sprocket, minimize the sag of the belt in the upper portion of the incline and allow a drip pan 72 to be placed close to the belt. Of course, the conventional flat shoes can be replaced by roller shoes. An internal shoe or roller 74 is used at the transition of the belt on the returnway from the incline to the lower horizontal segment.

The roller shoes' engagement with the belt is shown in FIG. 6. Left and right roller shoes 60 hold down the belt 48, which is supported on a carryway bed 76 of the conveyor frame. Edge guides 66 restrain the belt from wandering laterally. The shoes' rollers 62 provide a low-friction bearing to the outer surface of the belt. In the returnway, roller shoes 68 at the side edges of the belt 48 support the belt in rolling contact and confine the belt against lateral movement. For added support, a roller shoe 78 without an edge guide is positioned at the center of the belt.

Although the invention has been described with respect to a few preferred versions, other versions are possible. For example, the rollers need not be partly recessed into cavities in the shoes; they could be elevated above the outer face of the shoe on stanchions supporting the ends of the axles. As another example, the outer face of the shoe could be linear, a series of linear segments, or specially curved contours. And the outer edge of the belt edge guide need not match the shape of the outer face of the shoe. So as these few examples suggest, the scope of the claims is not meant to be limited to the preferred versions described in detail.

What is claimed is:

1. A shoe for bearing against the outer surface of a moving conveyor belt, the shoe comprising:
   a body comprising a base and an opposite convex outer face extending from a first end to a second end of the body in a direction of conveyor belt travel and laterally from a first side to a second side of the body;
   at least one roller rotatably mounted at the outer face of the body to rotate by contact with the outer surface of a conveyor belt traveling along the outer face of the body in the direction of conveyor belt travel.

2. A shoe as in claim 1 wherein the shoe forms at least one cavity opening onto the outer face and the roller is rotatably received in the cavity with a salient portion of the roller extending past the outer face of the shoe.

3. A shoe as in claim 2 wherein the cavity opens onto the base.

4. A shoe as in claim 2 further comprising an axle for the roller and wherein the shoe forms laterally opposed slots across the cavity, the slots opening onto the outer face and the cavity for receiving the axle to support the roller for rotation.

5. A shoe as in claim 2 comprising a plurality of cavities opening onto the outer face between the first end and the second end.

6. A shoe as in claim 1 further comprising a wall along the first side of the body extending beyond the outer face.

7. A shoe as in claim 6 wherein the outer face is a portion of an arc of a circular cylinder having a first radius and wherein the wall has an outer edge that is a portion of an arc of a coaxial circular cylinder having a second radius greater than the first radius.

8. A shoe as in claim 1 wherein the roller is a spherical roller.

9. A shoe as in claim 1 wherein the roller is a cylindrical roller.

10. A shoe as in claim 1 further comprising mounting holes formed in at least one of the base of the shoe, the first side of the shoe, and the second side of the shoe for mounting the shoe to conveyor structure.

11. A shoe for bearing against a conveyor belt, the shoe comprising:
    a body comprising a base and an opposite outer face extending from a first end to a second end of the body in a direction of conveyor belt travel and laterally from a first side to a second side of the body;
    at least one roller rotatably mounted at the outer face of the body to rotate by contact with a conveyor belt traveling along the outer face of the body in the direction of conveyor belt travel;
    a wall along the first side of the body extending beyond the outer face;
    wherein the outer face is a portion of an arc of a circular cylinder having a first radius and wherein the wall has an outer edge that is a portion of an arc of a coaxial circular cylinder having a second radius greater than the first radius.

12. A shoe for bearing against a conveyor belt, the shoe comprising:
    a body having a base and an opposite convex outer face, a first end and a second end, and a first side and a second side, the body extending in height from the base to the opposite outer face, in length from the first end to the second end, and in width from the first side to the second side, and having one or more cavities formed in the shoe opening onto the outer face;

a roller rotatably disposed in each of the cavities with a salient portion of the roller protruding beyond the outer face of the body to rotate by contact with a conveyor belt traveling along the outer face of the body from the first end to the second end.

13. A shoe as in claim 12 wherein the cavities extend through the base of the shoe.

14. A shoe as in claim 12 further comprising an axle for the roller and wherein the shoe forms laterally opposed slots across the cavity, the slots opening onto the outer face and the cavity for receiving the axle to support the roller for rotation in the cavity.

15. A shoe as in claim 12 wherein the height of the body is greater midway between the first and second ends than at the first and second ends.

16. A shoe as in claim 12 further comprising a wall along the first side of the body extending to an outer edge at a height greater than the height of the body.

17. A shoe as in claim 16 wherein the outer edge of the wall and the outer face of the body form arcs of coaxial cylinders.

18. A conveyor comprising:

a conveyor belt in the form of an endless belt loop having an outer surface and an inner surface extending in width from a first side edge to a second side edge;

a conveyor frame supporting the conveyor belt for travel along a conveying path;

a shoe affixed along the conveying path and including a convex outer face and at least one roller protruding beyond the outer face into rolling contact with the outer surface of the endless belt loop.

19. A conveyor as in claim 18 wherein the shoe includes a wall upstanding from one side the outer face to guide one of the first and second side edges of the belt as it travels along the conveying path.

* * * * *